United States Patent
Markow et al.

(10) Patent No.: US 6,925,188 B1
(45) Date of Patent: Aug. 2, 2005

(54) PORTED SPEAKER ENCLOSURE OF A PORTABLE COMPUTER

(75) Inventors: Mitch A. Markow, Spring, TX (US); Dan V. Forlenza, Cypress, TX (US); Kevin R. Frost, Spring, TX (US); Greg B. Memo, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1193 days.

(21) Appl. No.: 08/880,032

(22) Filed: Jun. 20, 1997

(51) Int. Cl.[7] .................................................. H04R 1/02
(52) U.S. Cl. .......................... 381/306; 381/333; 381/388
(58) Field of Search ............................... 381/333, 386, 381/306, 345, 388, 385; 361/681–683

(56) References Cited

U.S. PATENT DOCUMENTS

| | | | |
|---|---|---|---|
| 3,870,820 A | 3/1975 | Suzuki et al. ............... 381/365 |
| 4,975,966 A | 12/1990 | Sapiejewski ............... 381/359 |
| 5,216,711 A | 6/1993 | Takagi et al. ............... 381/359 |
| 5,226,076 A | 7/1993 | Baumhauer, Jr. et al. ... 381/356 |
| 5,365,595 A | 11/1994 | Li ............................... 381/91 |
| 5,400,408 A | * 3/1995 | Lundgren et al. ........... 381/306 |
| 5,481,616 A | 1/1996 | Freadman ................... 381/388 |
| 5,577,126 A | * 11/1996 | Klippel ........................ 381/59 |
| 5,610,992 A | * 3/1997 | Hickman ..................... 381/386 |
| 5,613,011 A | 3/1997 | Chase et al. ................ 381/355 |
| 5,627,901 A | 5/1997 | Josephson et al. ............ 381/91 |
| 5,638,455 A | 6/1997 | Peiker ........................ 381/355 |
| 5,668,882 A | * 9/1997 | Hickman et al. ........... 381/300 |
| 5,682,290 A | 10/1997 | Markow et al. ............ 361/683 |
| 5,701,347 A | 12/1997 | Daniels et al. .............. 381/120 |
| 5,703,957 A | 12/1997 | McAteer ....................... 381/92 |
| 5,748,757 A | 5/1998 | Kubli et al. .................. 381/91 |
| 5,761,322 A | * 6/1998 | Illingworth et al. ......... 381/386 |
| 5,768,163 A | 6/1998 | Smith, II ............... 364/705.01 |
| 5,805,708 A | * 9/1998 | Freadman ................... 381/345 |
| 5,818,942 A | * 10/1998 | Freadman ................... 381/300 |
| 5,847,922 A | * 12/1998 | Smith et al. ................ 361/683 |

FOREIGN PATENT DOCUMENTS

EP         0801514 A2    10/1997    ............ H04R/5/02

OTHER PUBLICATIONS

"McGraw–Hill Encyclopedia of Science & Technology", pp. 305–309 (1982).
Christiansen, Donald, "Electronics Engineering Handbook", 4th Ed.pp. 23.55–23–56 (1996).
Gonneau, Daniel and Eckes, Beatrice E., "Audio Engineering Handbook", pp. 7.17, 7.38–7.39 (1988).

* cited by examiner

Primary Examiner—Sinh Tran
Assistant Examiner—Brian T. Pendleton

(57) ABSTRACT

A portable computer provides a modular ported speaker enclosure independent of the portable computer surfaces of the portable computer. The speaker enclosure can include a speaker enclosure top and a speaker enclosure base. A plurality of ports are formed into the speaker enclosure base. A plurality of port covers within the speaker enclosure can cover the inner surfaces of the plurality of ports. A plurality of loudspeakers are housed between the speaker enclosure top and the speaker enclosure base.

13 Claims, 5 Drawing Sheets

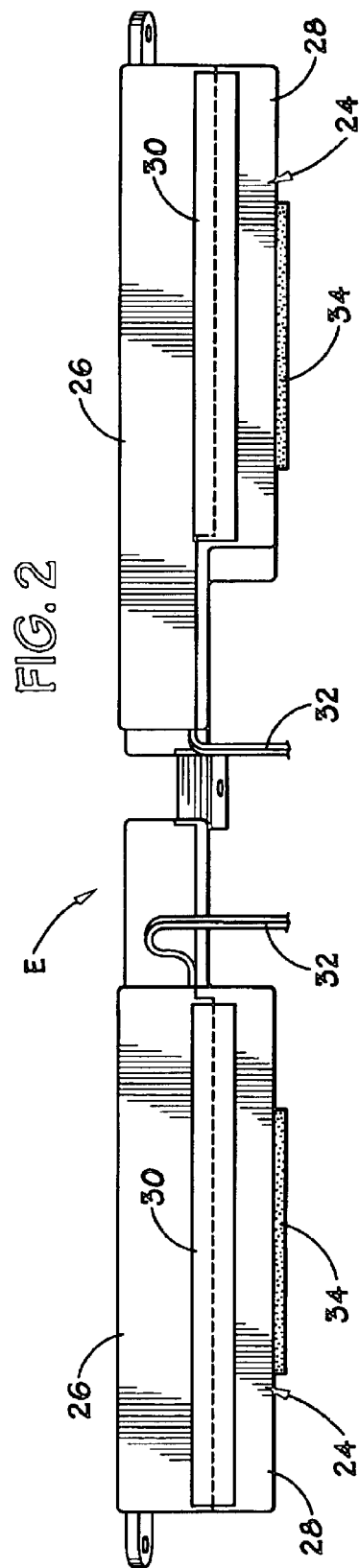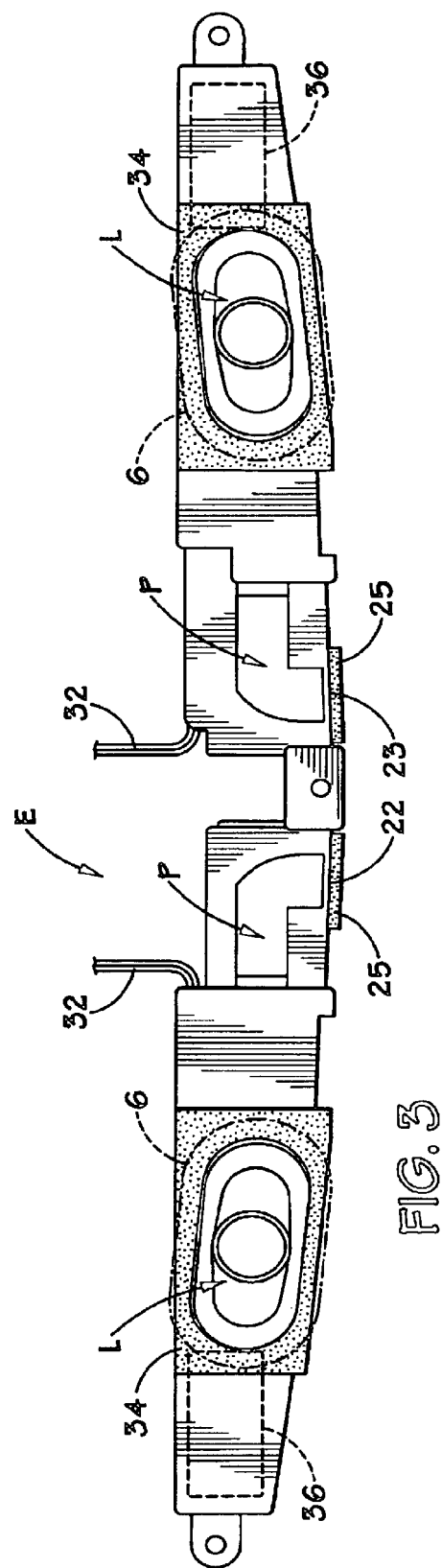

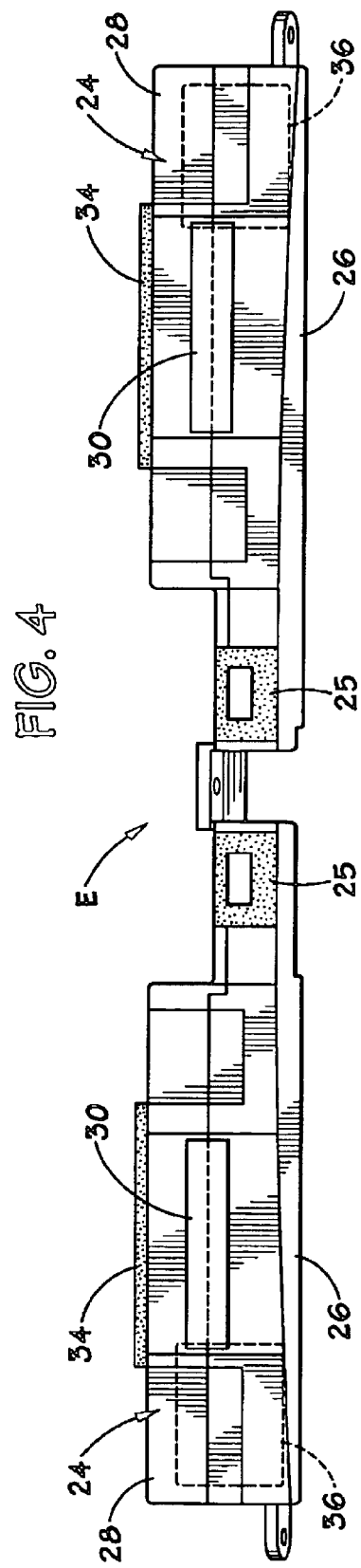

PORTED SPEAKER ENCLOSURE OF A PORTABLE COMPUTER

BACKGROUND OF THE INVENTION

1. Field of the Invention

The present invention relates to a ported speaker enclosure of a portable computer.

2. Description of the Related Art

Sealed box or closed cabinet loudspeakers present in conventional portable computers have been limited in loudspeaker excursion by the risk of mechanical and magnetic distortions. Loudspeaker excursion refers to the upward and downward or inward and outward movement of the components of a loudspeaker such as the windings, voice coil, front and back plates, and cone. The risks of mechanical distortions from significant loudspeaker excursion may include banging the windings of the loudspeaker against the front or back plates of the loudspeaker, overstretching the corrugated or folded material known in the art as the "spider" which is typically near the center of the loudspeaker extending between the cone and the frame, or flattening out the curved elastic material known in the art as the "surround" which is typically near the top of the loudspeaker and is positioned on the frame.

A loudspeaker is essentially an electroacoustic transducer that uses a magnetic circuit to achieve acoustic radiation. When current provided to a loudspeaker flows through the voice coil, a magnetic field is produced. As the polarity of the current changes like a sine wave, magnetic waves travel across the gap between the voice coil and the permanent magnet. The gap between the permanent magnet and voice coil of a loudspeaker serves as the primary magnetic flux resistance or reluctance for the magnetic circuit of a loudspeaker. As a result of magnetic waves travelling across the gap, the magnetic field of the voice coil either repels or attracts the magnetic field of the permanent magnet. This causes the loudspeaker to move upward and downward, producing compression and rarefaction of air molecules surrounding the cone of the loudspeaker.

As loudspeaker excursions become significant, components of the loudspeaker become mechanically stiffer and the force constant of these components increases. The increased force constant leads to a higher force reaction, producing mechanical nonlinearities. In addition, the presence of magnetic nonlinearities has been determined by the relationship between the voice coil and the gap. A loudspeaker excursion producing significant magnetic nonlinearities is an excursion that places the voice coil out of the gap. Magnetic nonlinearities have increased as the degree of displacement or deflection of the voice coil out of the gap has increased.

Due to the risk of these mechanical and magnetic distortions, significant loudspeaker excursions associated with acoustic radiation at low frequencies has been avoided in loudspeakers in portable computers. The risk of mechanical and magnetic distortions due to significant loudspeaker excursions is a particularly acute risk in portable computers due to the spatial constraints of a portable computer and the steep low frequency region of a sound pressure level waveform associated with ported speakers. As such, the low frequency acoustic performance of loudspeakers in portable computers is significantly less than the high quality acoustic performance of stand alone loudspeakers at low frequencies.

SUMMARY OF THE INVENTION

Briefly, a portable computer provides a modular ported speaker enclosure independent of the portable computer surfaces of the portable computer. The speaker enclosure can include a speaker enclosure top and a speaker enclosure base. A plurality of ports are formed into the speaker enclosure base. A plurality of port covers within the speaker enclosure can cover the inner surfaces of the plurality of ports. A plurality of loudspeakers are housed between the speaker enclosure top and the speaker enclosure base.

BRIEF DESCRIPTION OF THE DRAWINGS

A better understanding of the present invention can be obtained when the following detailed description of the preferred embodiment is considered in conjunction with the following drawings, in which:

FIG. 2 is a top view of the speaker enclosure apparatus of the present invention;

FIG. 3 is a front elevation of the speaker enclosure apparatus of FIG. 2;

FIG. 4 is a bottom view of hte speaker enclosure apparatus of FIG. 2;

DETAILED DESCRIPTION OF THE PREFERRED EMBODIMENT

Figure 1:
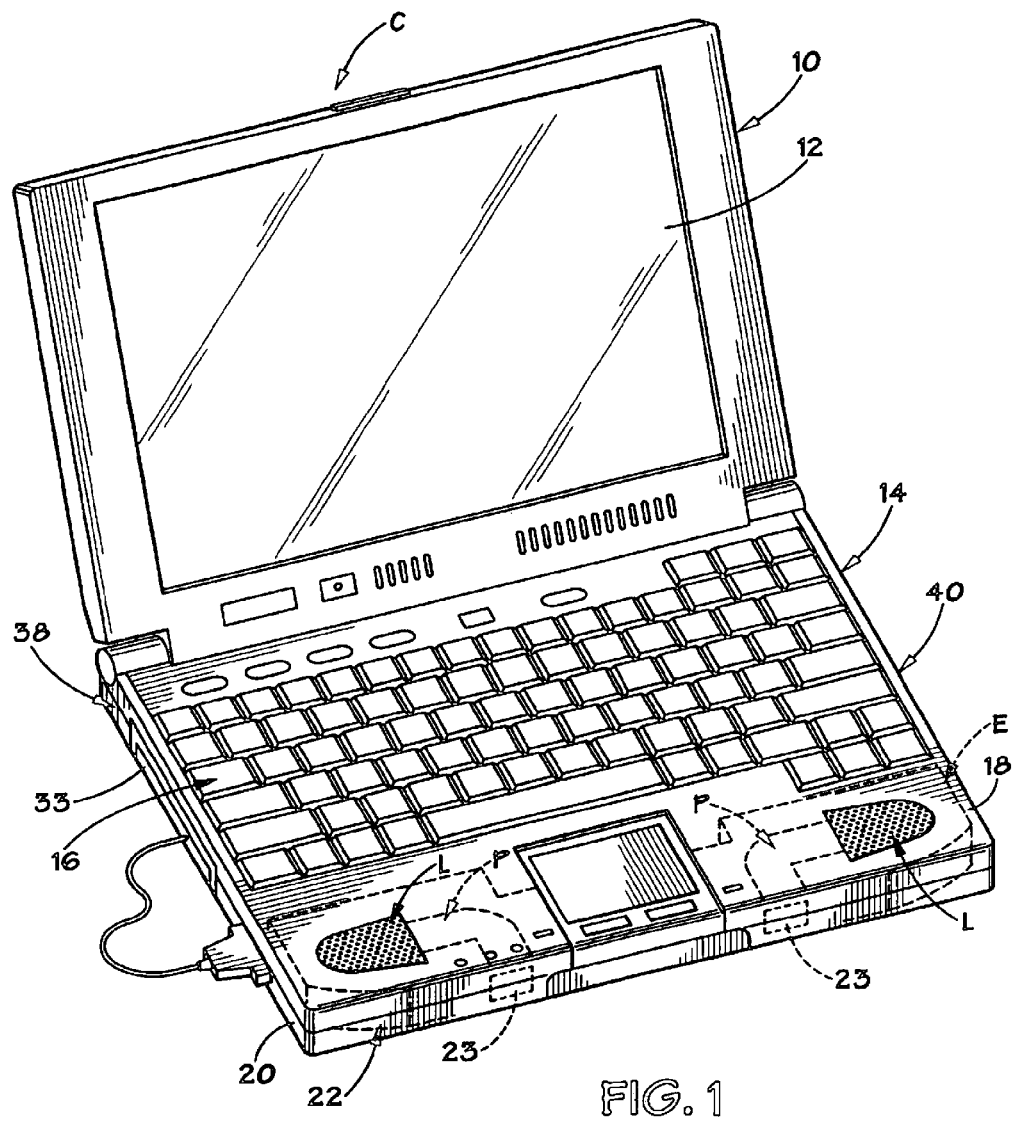
FIG. 1. is an isometric view of a computer case containing a computer system showing the case in its open state.

Turning now to the drawings, FIG. 1 shows an isometric view of a portable computer case C containing a computer system, the case C being in its open state. The portable computer case C includes an upper shell 10 housing a display screen 12 and other components and also a lower shell 14 housing a keyboard 16 along with other components. In the preferred embodiment of the present invention, the ported speaker enclosure E of the present invention shown in broken line is housed in the lower shell 14. The curved portions of the speaker enclosure E extending between each loudspeaker L and the front side surface 22 of the lower shell 14 are ports P of the present invention. The openings 23 of the ports P are thus formed into the front side surface 22 of the lower shell 14. Each opening 23 of the ports P is preferably surrounded by a cushion 25 to allow for acoustic absorption between the ports P and the front side surface 22 of the lower shell 14. The ported speaker enclosure E is preferably shaped to accommodate nearby components within the portable computer case C. In addition, the enclosure E is appropriately sized for the surface area between the upper surface 18 and lower surface 20 of the lower shell 14. Both surfaces 18 and 20 are preferably made of synthetic plastic or other suitable pliant material. It should be understood that alternatively a ported speaker enclosure E may be designed to be housed in the upper shell 10 of portable computer case C.

Figure 5:
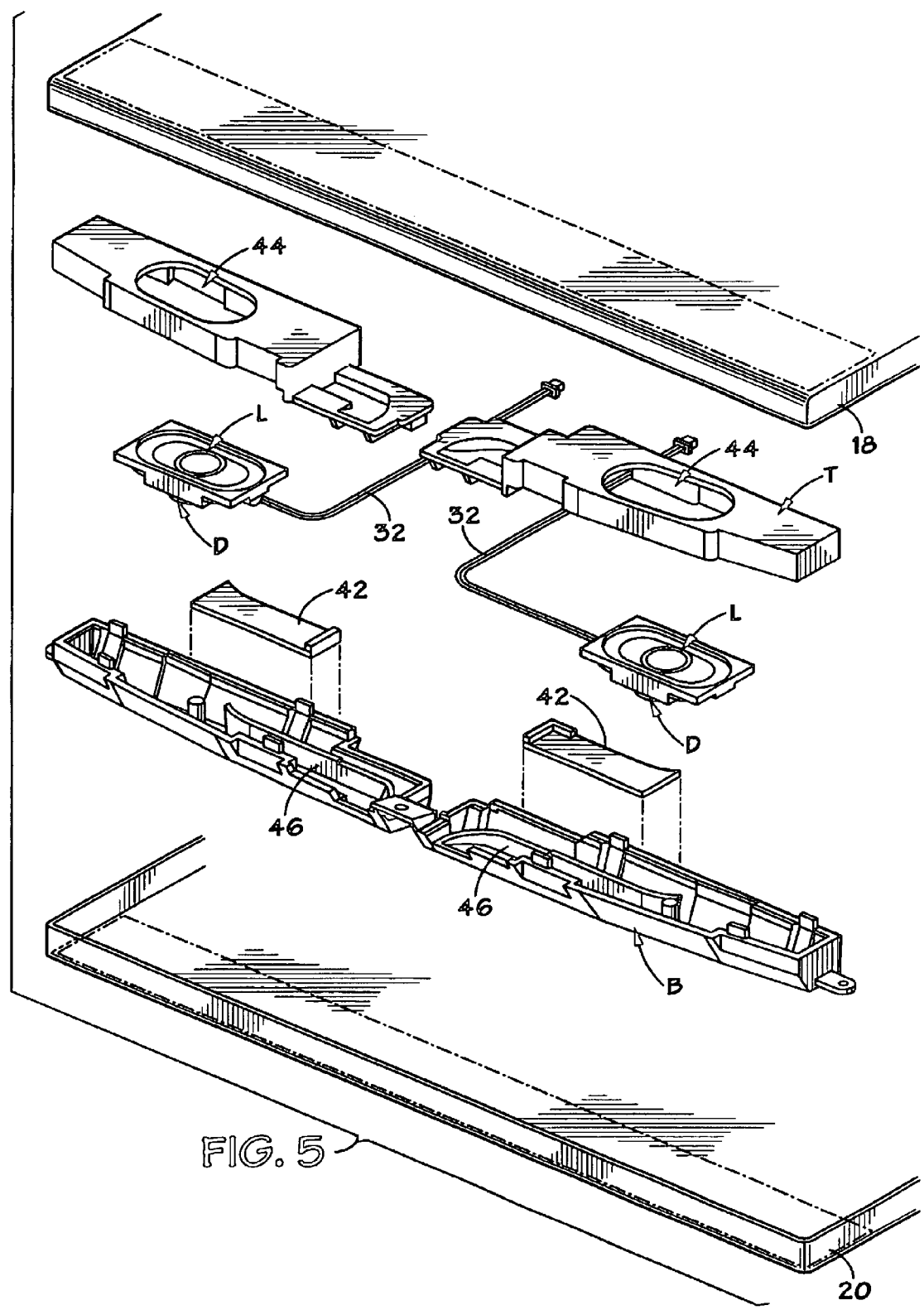
FIG. 5 is an isometric, partly exploded view of the components of the speaker enclosure apparatus of FIG. 2 shown with upper and lower surfaces for a portable computer shell.

Referring to FIG. 2, a side elevational view of the ported speaker enclosure E of the present invention is shown. The preferred embodiment of the ported speaker enclosure E allows for two loudspeakers L. The loudspeakers L are each housed in a separable speaker box 24 integrally formed into the ported speaker enclosure E. The upper portion 26 of each speaker box 24 is formed by the speaker enclosure top T (FIG. 5). The lower portion 28 of each speaker box 24 is formed by the speaker enclosure base B. The speaker enclosure top T and base B are preferably held together by sheet tape 30. To accommodate the cord 32 for each speaker L, the enclosure E includes holes for passageway of each speaker cord 32. Each speaker L is preferably coupled through the speaker cord 32 to an acoustic signal generating device such as a CD-ROM drive 33.

Referring to FIG. 3, a plan view of the speaker enclosure E is shown. In the preferred embodiment, the loudspeakers L are preferably equidistant from the center of the speaker enclosure E. Also, the loudspeakers L are preferably surrounded by cushions 34. Each cushion 34 is preferably made of poly-ether urethane foam which serves as an acoustic absorber. By using the cushion 34 as an acoustic absorber between a loudspeaker L and the upper surface 18 of the lower shell 14, rattling sounds produced by vibrations of the loudspeaker L are minimized. In the preferred embodiment, foam 36 is provided next to the side of each loudspeaker L opposite the center of the speaker enclosure E. This foam 36 serves as an acoustic absorber between the loudspeakers L and the right and left side surfaces 38 and 40 of the lower shell 14.

Referring to FIG. 5, a partially exploded view of the components of the ported speaker enclosure E with the upper surface 18 and lower surface 20 of a bottom portable shell 14 is shown. The ported speaker enclosure E includes an enclosure top T, enclosure base B, and port covers 42. Formed in the enclosure top T are openings 44 sized for the cones 58 of the loudspeakers L. According to the present invention, port covers 48 are used to cover the inner surfaces 46 of each port P formed in the enclosure base B. A port-cover 48 thus is the top wall for a port P such that air may suitably be forced in and out of the port P. In the preferred embodiment, the enclosure top T, loudspeakers L, port covers 42, and enclosure base B are respectively enclosed between the upper surface 18 and lower surface 20 of the bottom portable shell 14.

Figure 6:
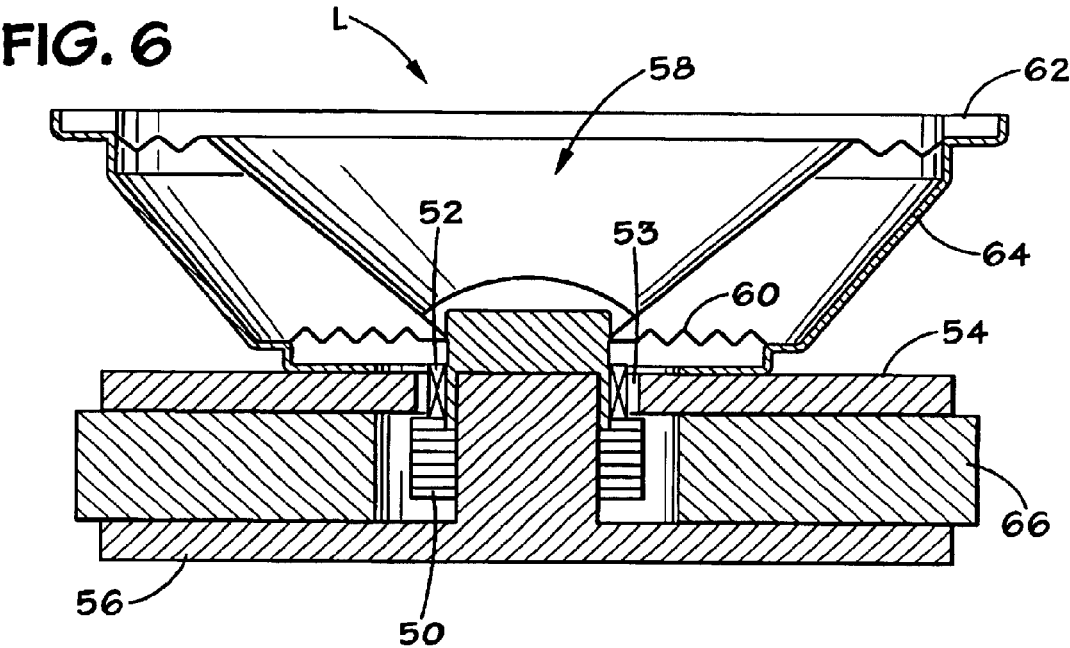
FIG. 6 is an enlarged cross-sectional view of the loudspeaker of FIG. 3 circled and having numeral "6" designating same.

Referring to FIG. 6, a cross-sectional view of one of the loudspeakers L housed by a ported speaker enclosure E is shown. Sealed box or closed cabinet loudspeakers present in conventional portable computers have been limited in loudspeaker excursion by the risk of mechanical and magnetic distortions. Loudspeaker excursion refers to the upward and downward or inward and outward movement of the components of a loudspeaker such as the windings 50, voice coil 52, front and back plates 54 and 56, and cone 58. The risks of mechanical distortions from significant loudspeaker excursion may include banging the windings 50 of the loudspeaker L against the front or back plates 54 and 56 of the loudspeaker L, overstretching the corrugated or folded material 60 known in the art as the "spider" which is near the center of the loudspeaker L extending between the cone 58 and the frame 64 or flattening out the curved elastic material 62 known in the art as the "surround" which is near the top of the loudspeaker L and is positioned on the frame 64.

A loudspeaker L is essentially an electroacoustic transducer that uses a magnetic circuit to achieve acoustic radiation. When current provided to a loudspeaker L flows through the voice coil 52, a magnetic field is produced. As the polarity of the current changes like a sine wave, magnetic waves travel across a gap 53 between the voice coil 52 and the permanent magnet 66. The gap 53 between the permanent magnet 66 and voice coil 52 of a loudspeaker L serves as the primary magnetic flux resistance or reluctance for the magnetic circuit of a loudspeaker L. As a result of magnetic waves travelling across the gap 53, the magnetic field of the voice coil 52 either repels or attracts the magnetic field of the permanent magnet 66. This causes the loudspeaker L to move upward and downward producing compression and rarefaction of air molecules surrounding the cone 58 of the loudspeaker L.

As loudspeaker excursions become significant, components of the loudspeaker L become mechanically stiffer and the force constant of these components increases. The increased force constant leads to a higher force reaction producing mechanical nonlinearities. In addition, the relationship between the voice coil 52 and the gap 53 has been determined by the presence of magnetic nonlinearities. A loudspeaker excursion producing significant magnetic nonlinearities is an excursion that places the voice coil 52 out of the gap 53. Magnetic nonlinearities have increased as the degree of displacement of the voice coil 52 out of the gap 53 increased.

Due to the risk of these mechanical and magnetic distortions, significant loudspeaker excursions associated with acoustic radiation at low frequencies have been avoided in loudspeakers in portable computers. The risk of mechanical and magnetic distortions due to significant loudspeaker excursions is a particularly acute risk in portable computers due to the spatial constraints of a portable computer. As such, the low frequency acoustic performance of loudspeakers in portable computers is significantly less than the high quality acoustic performance of stand alone loudspeakers at low frequencies.

Figure 7:
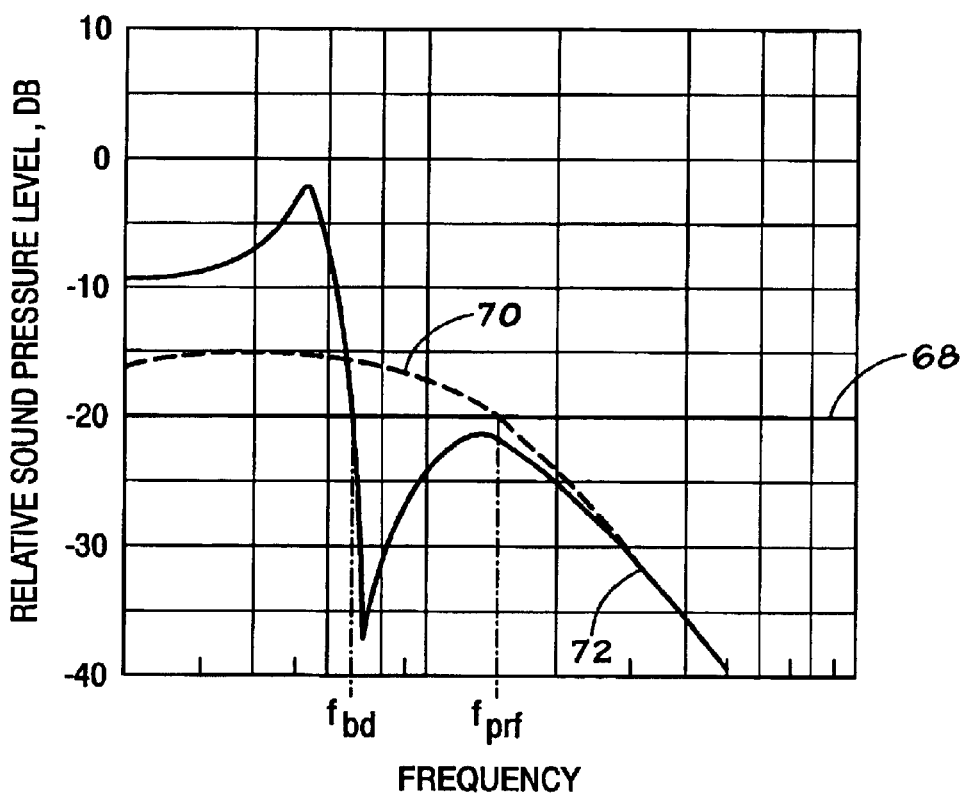
FIG. 7 is a graph of loudspeaker excursions versus frequency for a conventional sealed box loudspeaker for a portable computer and a ported loudspeaker of the present invention for a portable computer.

Referring to FIG. 7, a graph of loudspeaker excursions versus frequency for a conventional sealed box portable loudspeaker and a ported loudspeaker system of the present invention is shown. At a certain predetermined low frequency $f_{prf}$, the loudspeaker excursion of a sealed box loudspeaker exceeds a safe displacement level, risking damage to the loudspeaker system. In FIG. 7, the recommended maximum excursion level 68 is illustratively shown as –20 decibels. For frequencies below the low frequency $f_{prf}$, the loudspeaker excursion curve 70 corresponding to the sealed box loudspeaker shown in broken line exceeds the maximum recommended excursion level 68, creating a significant risk of mechanical and magnetic distortions. Contrastingly, a loudspeaker excursion curve 72 corresponding to the ported speaker enclosure E of the present invention does not exceed the recommended maximum excursion level at $f_{prf}$. The ported speaker enclosure loudspeaker excursion curve 72 rises and then falls at a particular frequency such that the waveform 72 remains below the recommended maximum excursion level 68 at $f_{prf}$ and for certain frequencies lower than $f_{prf}$.

The ported speaker enclosure E is used for acoustic radiation between $f_{prf}$ and $f_{bd}$, the frequency at and above which the ported speaker enclosure waveform 72 remains below the recommended maximum excursion level 68. While a conventional sealed box loudspeaker may only safely provide acoustic output energy above above $f_{prf}$, the ported speaker enclosure E of the present invention provides acoustic output between $f_{prf}$ and $f_{prf}$. The difference between $f_{bd}$ and $f_{prf}$ is approximately an octave. Thus, the ported speaker enclosure E of the present invention achieves improved low frequency acoustic performance.

The ported speaker enclosure waveform 72 is generated by tuning the port P of the speaker enclosure E to a certain frequency, $f_{prf}$. At such a frequency, the port P becomes the acoustic resonator instead of the loudspeaker cone 58. The frequency $f_{prf}$ is therefore termed port resonance frequency. Port resonance frequency $f_{prf}$ is a function of the compliance of the port P and the mass of the volume of air within the port P; therefore, compliance and mass are tuned to define the resonance frequency for the port P.

When a port P is tuned to a resonance frequency, an impedance load is placed around that frequency on the back of a driver D. The components of a loudspeaker L other than the cone 58 may be collectively termed a driver D (FIG. 5).

Therefore, at port resonance frequency $f_{prp}$, the loudspeaker cone 58 vibrates very little, if at all, such that the cone 58 does not serve as an acoustic resonator. By using a port P instead of a loudspeaker cone 58 for acoustic radiation at low frequencies, the excursion of the loudspeaker L is limited reducing the likelihood of mechanical damage to the loudspeaker L and driver D.

Ported speakers are known for having a steep loudspeaker excursion curve at certain frequencies. Therefore, at such frequencies, small decrements in frequency produce significant sound pressure level increments. Due to the sensitivity of loudspeakers in a portable computer to excursions, which is partly derived from the reduced size of speaker components for a portable computer, conventional portable computers have been unable to achieve a ported speaker enclosure E. According to the present invention, an electrical input signal to the speaker may be filtered to control loudspeaker excursions below a particular low frequency $f_{bd}$. Such control minimizes the likelihood of mechanical damage to the loudspeaker L and driver D. Thus, the present invention achieves a ported speaker enclosure E in a portable computer case C that minimizes the likelihood of mechanical damage to a loudspeaker L and driver D.

With ports P of the present invention formed into a speaker enclosure E in a portable computer, the risk of mechanical and magnetic distortion of acoustic signals due to loudspeaker excursions is significantly reduced. Further, it should be understood that the dimensions of the ports P such as length, width, and curvature are specially configured to achieve acoustic output over a selected low frequency range and to accommodate nearby components within the portable computer.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A portable computer system, comprising:
   a plurality of portable computer surfaces; and
   a modular ported speaker enclosure, comprising:
      a speaker enclosure top independent of the plurality of portable computer surfaces;
      a speaker enclosure base independent of the plurality of portable computer surfaces and having a plurality of ports formed therein the speaker enclosure base; and
      a plurality of loudspeakers housed between the speaker enclosure top and the speaker enclosure base.

2. The portable computer system of claim 1, the modular ported speaker enclosure further comprising:
   a plurality of port covers to cover inner surfaces of the plurality of ports.

3. A modular ported speaker enclosure for a portable computer system, the modular ported speaker enclosure comprising:
   a speaker enclosure top independent of a plurality of portable computer surfaces of the portable computer system;
   a speaker enclosure base independent of the plurality of portable computer surfaces and having a plurality of ports formed therein the speaker enclosure base; and
   a plurality of loudspeakers housed between the speaker enclosure top and the speaker enclosure base.

4. The ported speaker enclosure of claim 3, further comprising:
   a plurality of port covers to cover inner surfaces of the plurality of ports.

5. A portable computer system, comprising:
   a top portable computer surface;
   a bottom portable computer surface; and
   a modular ported speaker enclosure; comprising:
      a speaker enclosure top disposed non-integrally to the top portable computer surface;
      a speaker enclosure base disposed non-integrally to the bottom portable computer surface and having a plurality of ports formed therein the speaker enclosure base; and
      a plurality of loudspeakers housed between the speaker enclosure top and the speaker enclosure base.

6. The portable computer system of claim 5, further comprising:
   a plurality of port covers to cover inner surfaces of the plurality of ports.

7. The portable computer system of claim 5, wherein the top portable computer surface comprises a lower shell upper surface of the portable computer system and the bottom portable computer surface comprises a lower shell lower surface of the portable computer system.

8. A modular ported speaker enclosure for a portable computer system, the modular ported speaker enclosure comprising:
   a speaker enclosure top disposed non-integrally to a top portable computer surface of the portable computer system;
   a speaker enclosure base disposed non-integrally to a bottom portable computer surface of the portable computer system and having a plurality of ports formed therein the speaker enclosure base; and
   a plurality of loudspeakers housed between the speaker enclosure top and the speaker enclosure base.

9. The ported speaker enclosure of claim 8, further comprising:
   a plurality of port covers to cover inner surfaces of the plurality of ports.

10. A modular ported speaker enclosure for a portable computer system, the modular ported speaker enclosure comprising:
    a means for providing a plurality of ports independent of a plurality of portable computer surfaces of the portable computer system; and
    a means for housing a plurality of loudspeakers independent of the plurality of portable computer surfaces.

11. The speaker enclosure of claim 10, further comprising:
    a means for covering inner surfaces of the plurality of ports independent of the plurality of portable computer surfaces.

12. A portable computer system, comprising:
    a plurality of portable computer surfaces; and
    a modular ported speaker enclosure, comprising:
       a means for providing a plurality of ports independent of the plurality of portable computer surfaces of the portable computer system; and
       a means for housing a plurality of loudspeakers independent of the plurality of portable computer surfaces.

13. A portable computer system of claim 12, the modular ported speaker enclosure further comprising:
    a means for covering inner surfaces of the plurality of ports independent of the plurality of portable computer surfaces.

* * * * *